(12) United States Patent
Venkatesha et al.

(10) Patent No.: US 9,384,751 B2
(45) Date of Patent: Jul. 5, 2016

(54) USER AUTHENTICATION OF VOICE CONTROLLED DEVICES

(71) Applicant: Honeywell International Inc., Morristown, NJ (US)

(72) Inventors: Sharath Venkatesha, Minnetonka, MN (US); Hai D. Pham, Eden Prairie, MN (US); Aravind Padmanabhan, Plymouth, MN (US); James G. McAward, Blue Point, NY (US)

(73) Assignee: Honeywell International Inc., Morris Plains, NJ (US)

( * ) Notice: Subject to any disclaimer, the term of this patent is extended or adjusted under 35 U.S.C. 154(b) by 237 days.

(21) Appl. No.: 13/888,029

(22) Filed: May 6, 2013

(65) Prior Publication Data

US 2014/0330560 A1    Nov. 6, 2014

(51) Int. Cl.

| | |
|---|---|
| *G10L 15/26* | (2006.01) |
| *H04L 12/28* | (2006.01) |
| *G10L 21/00* | (2013.01) |
| *G06F 1/32* | (2006.01) |
| *G06F 21/32* | (2013.01) |
| *G06F 3/16* | (2006.01) |

(Continued)

(52) U.S. Cl.
CPC ............ *G10L 21/00* (2013.01); *G06F 1/3231* (2013.01); *G06F 3/167* (2013.01); *G06F 21/32* (2013.01); *G06F 21/83* (2013.01); *G10L 15/22* (2013.01); *G10L 15/26* (2013.01); *H04L 12/282* (2013.01); *G06F 2221/2111* (2013.01); *G10L 17/10* (2013.01); *G10L 2015/223* (2013.01); *G10L 2015/227* (2013.01); *H04L 12/2803* (2013.01); *H04L 12/2816* (2013.01); *H04L 12/2821* (2013.01); *H04L 12/2823* (2013.01); *H04L 12/2829* (2013.01); *H04L 63/0861* (2013.01)

(58) Field of Classification Search
CPC ............ H04L 12/2803; H04L 12/2816; H04L 12/2818; H04L 12/282; H04L 12/2821; H04L 12/2823; H04L 12/2827; H04L 12/2829; H04L 12/283; H04L 12/2832; H04L 12/2838; Y02B 60/1289; G06F 1/3231
See application file for complete search history.

(56) References Cited

U.S. PATENT DOCUMENTS 6,219,645 B1 * 4/2001 Byers ........................... 704/275
6,952,155 B2 * 10/2005 Himmelstein ............... 340/5.52

(Continued)

FOREIGN PATENT DOCUMENTS

| EP | 2028062 | 2/2009 |
|---|---|---|
| EP | 2028062 A2 | 2/2009 |

(Continued)

OTHER PUBLICATIONS

EP Search Report related to EP Application 14165319.6-1910 dated Jul. 28, 2014 (3 pages).

(Continued)

*Primary Examiner* — Richard Zhu
(74) *Attorney, Agent, or Firm* — Brooks, Cameron & Huebsch, PLLC (57) ABSTRACT

Methods, systems, and devices are described herein. One method can include receiving a voice command from a user at a voice controlled device, determining a presence of the user to the device using a sensor, converting the voice command to a device specific command, and performing the device specific command using the device in response to the determined presence.

19 Claims, 4 Drawing Sheets

(51) Int. Cl.
*G06F 21/83* (2013.01)
*G10L 15/22* (2006.01)
*G10L 17/10* (2013.01)
*H04L 29/06* (2006.01)

(56) References Cited

U.S. PATENT DOCUMENTS

| | | | |
|---|---|---|---|
| 7,249,024 B2 * | 7/2007 | Engstrom | 704/270 |
| 8,340,975 B1 * | 12/2012 | Rosenberger | 704/275 |
| 8,630,741 B1 * | 1/2014 | Matsuoka | H04L 12/2829 700/12 |
| 8,738,380 B2 * | 5/2014 | Baldwin | G06Q 30/02 704/257 |
| 9,031,845 B2 * | 5/2015 | Kennewick | G06F 17/30654 455/517 |
| 2002/0069063 A1 * | 6/2002 | Buchner et al. | 704/270 |
| 2006/0192775 A1 * | 8/2006 | Nicholson et al. | 345/211 |
| 2009/0204410 A1 * | 8/2009 | Mozer et al. | 704/275 |
| 2009/0299745 A1 * | 12/2009 | Kennewick | G10L 15/32 704/257 |
| 2010/0131273 A1 | 5/2010 | Aley-Raz et al. | |
| 2010/0138680 A1 * | 6/2010 | Brisebois et al. | 713/324 |
| 2012/0008802 A1 * | 1/2012 | Felber | 381/107 |
| 2012/0200391 A1 | 8/2012 | Sugiyama et al. | |
| 2012/0245941 A1 | 9/2012 | Cheyer | |
| 2013/0250034 A1 * | 9/2013 | Kang et al. | 348/14.02 |
| 2014/0278437 A1 * | 9/2014 | Shen et al. | 704/275 |
| 2015/0228274 A1 * | 8/2015 | Leppanen | G10L 15/20 704/243 |

FOREIGN PATENT DOCUMENTS

| | | | |
|---|---|---|---|
| EP | 2028062 | 1/2011 | |
| FI | WO 2014064324 A1 * | 5/2014 | G10L 15/20 |
| WO | 0076177 | 12/2000 | |
| WO | 0076177 A1 | 12/2000 | |

OTHER PUBLICATIONS

Examination Report from related European Patent Application 14165319, dated Feb. 2, 2016, 5 pp.

* cited by examiner

USER AUTHENTICATION OF VOICE CONTROLLED DEVICES

TECHNICAL FIELD

The present disclosure relates to methods, devices, and systems for user authentication of voice controlled devices.

BACKGROUND

Voice control of a device can allow a user to operate the device without having to touch the device. For instance, voice control can allow for operation of the device without spreading of germs, without having to set down tools and/or equipment, and/or without having to visually see a user interface. A voice controlled device can be used in a home and/or work environment, for example. For instance, voice control can have applications in thermostats, security systems, home appliances, equipment for firefighting, hospital equipment, elevators, and/or in other industrial environments.

Previous approaches for voice controlled devices can be activated and/or controlled unintentionally, and/or by an unauthorized user. For instance, a voice controlled device can recognize a voice command when a user is not present (e.g., a recorded voice, such as from a voicemail machine), and/or when a user does not intend to control the device (e.g., is not speaking to the device). Further, an unauthorized user can control the device using a recording of an authorized user and/or by speaking a voice command themselves. Thereby, previous approaches may be frustrating to use due to unintentional voice control of the device and/or may not have sufficient security preventions.

DETAILED DESCRIPTION

Methods, systems, and devices are described herein. For example, one or more embodiments can include receiving a voice command from a user at a voice controlled device, determining a presence of the user to the device using a sensor, converting the voice command to a device specific command, and performing the device specific command using the voice controlled device in response to the determined presence.

A voice controlled device can function by using a speech recognition engine that can decipher a voice command (e.g., user voice) and convert the voice command into a device specific command (e.g., a computing device command), which can then be executed by the device. However, performance of the voice controlled device can be hindered as a result of the voice controlled device recognizing a voice command that the user does not intend to be a voice command, which can cause user frustration or place the user in danger, depending on where the voice controlled device is used. For instance, if the voice controlled device is located in a work and/or home environment, multiple users may be present in the environment. The voice controlled device may recognize a voice command from a user that is not intending to control the device (e.g., two people in the environment may be talking to each other, a user may be on a telephone, etc.)

In addition, a user may not want an unauthorized user to control the voice controlled device. To prevent unauthorized users from controlling a voice controlled device, the voice controlled device may authorize the user. Authorizing a user, as used herein, can include determining that the user is authorized to issue a particular command. For instance, due to security concerns, a user may not want to limit access to a voice controlled device. Using the example of a work and/or home environment, with multiple users present in the environment, a user may want to limit access to the device to a sub-set of the present users. For example, a user may want to limit access to a security system that is a voice controlled device to a predefined sub-set of users.

In some instances, voice identification (VID) techniques may be used to authorize a user. For instance, VID techniques can recognize the user through the spoken command. However, performance of VID may degrade in the presence of noise (e.g., background noise) and is dependent on the length of the spoken command (e.g., as the length of the spoken command decrease, performance decreases). Best practices from the field of human factors and human machine interactions (e.g., interactions of a user with a voice controlled device, such as spoken commands) minimize the length of spoken commands to the devices and/or systems. Thus, VID, by itself, is not sufficient to be used for authorization of a user.

Current approaches to voice controlled devices may not verify an authentication and/or authorization of a user prior to processing a voice command and/or may have limited use and/or low performance. Thereby, previous approaches for voice controlled devices may not be secure and/or may lead to frustration for a user due to execution of unintentional voice commands.

In contrast, voice controlled devices, systems, and methods are provided for user authentication of voice controlled devices. User authentication of a voice controlled device can include determining (e.g., identifying) a presence of a user (e.g., a live human) to the voice controlled device prior to executing a command. A presence, as used herein, can include a presence of the user proximate to the device. That is, determining a presence of a user can include determining if the user is a person and not a machine.

In various embodiments, the presence of the user can be based on a motion measurement, a temperature change measurement, video verification, and/or a distance of the user from the device as measured by one or more sensors. The one or more sensors can be a component of the voice controlled device (e.g., an integrated sensor component) and/or can be a separate device located in an environment with the voice controlled device.

The determination of a presence of the user can mitigate unintentional voice control and/or can assist in ensuring a live human is speaking the voice command (e.g., the command is not a recording and/or a machine). In various embodiments, in order to achieve accuracy in user authentication, a combination of two or more different sensors can be used to determine the proximity of the user. For instance, utilizing multiple sensors can include using multiple modalities, such as voice, image, and/or temperature, among other modalities.

Further, in accordance with one or more embodiments, the sensor can be used to verify an authorization of a user prior to executing a command. Verifying an authorization of a user can include determining if the user is authorized to issue a command and/or to access a resource. For instance, the voice controlled device can compare a measurement from a sensor to predetermined and/or predefined data associated with authorized users to determine if the user is authorized to control the device. In response to verifying the user is an authorized user, the voice controlled device can execute the command. The measurement, in various embodiments, can include voice biometrics (e.g., voice sound waves, tone) and/or images of the user (e.g., to perform face recognition techniques).

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits.

As used herein, "a" or "a number of" refers to one or more. For example, "a number of sensors" can refer to one or more sensors. Additionally, the designator "N", "P", and "R", as used herein, particularly with respect to reference numerals in the drawings, indicate that a number of the particular features so designed can be included with a number of embodiments of the present disclosure.

Figure 1:
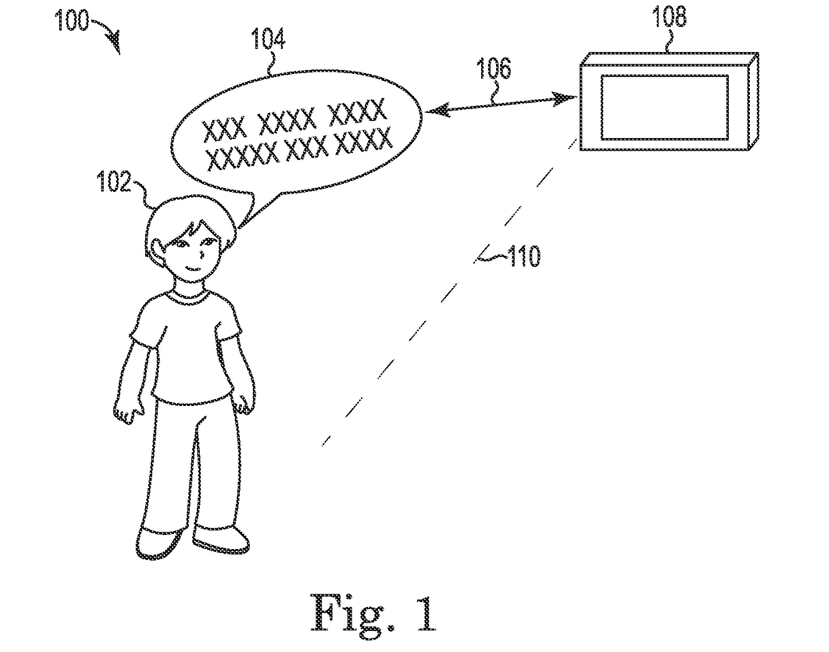
FIG. 1 illustrates an example environment for user authentication of a voice controlled device according to one or more embodiments of the present disclosure.

FIG. 1 illustrates an example environment 100 for user authentication of a voice controlled device 108 according to one or more embodiments of the present disclosure. As illustrated by the embodiment of FIG. 1, the environment 100 can include a user 102 and a voice controlled device 108. The user 102, as used herein, can include a live human in the environment 100. The voice controlled device 108 can be a computing device and/or contain a computing component (e.g., an embedded processor), for example.

Figure 3:
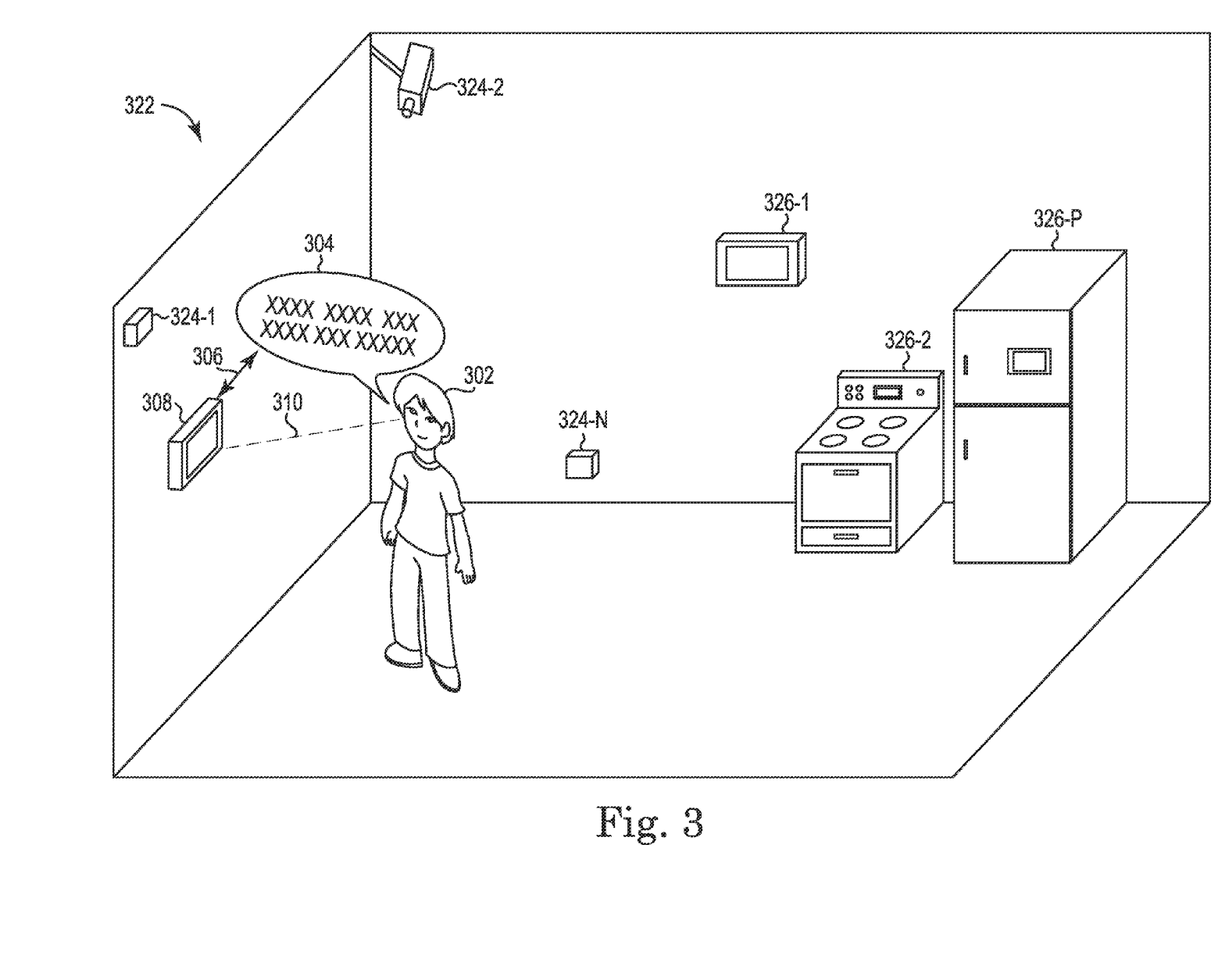
FIG. 3 illustrates an example of an environment for user authentication of a voice controlled device according one or more embodiments of the present disclosure.

For instance, the voice controlled device 108 can be a security system panel, a thermostat, a home appliance, equipment for firefighting, hospital equipment, elevators, and/or other devices located in the home and/or work environment, although examples are not so limited. Although the present embodiment illustrates one voice controlled device 108, examples in accordance with the present disclosure are not so limited. Environments in accordance with some embodiments of the present disclosure can include a number of voice controlled devices (e.g., as illustrated in FIG. 3 and discussed further herein).

In some embodiments, the voice controlled device 108 can receive a signal 106 associated with a voice command 104. For instance, the voice controlled device 108 can include a speech recognition engine that can decipher the voice command 104 and convert the voice command 104 into a device specific command (e.g., a computing device command), which can instruct the voice controlled device 108 to perform a function. The voice controlled device 108 can receive the signal 106 associated with the voice command 104 utilizing a microphone component, for instance. For example, where the voice controlled device 108 is and/or is associated with a thermostat, the device specific command can include an instruction to adjust a temperature controlled by the thermostat.

In various embodiments, the voice controlled device 108 can perform VID in addition to converting the voice command 104 into a device specific command. VID, as used herein, can include recognizing the user through the spoken voice command 104. Thereby, VID can be used to authenticate the user 102. For instance, VID can be used in addition to a measurement from one or more sensors.

The environment 100 can include a home and/or work environment, for example. For instance, the environment 100 associated with the voice controlled device 108 can be proximate (e.g., collocated) to the voice controlled device 108. The environment 100 can, in various embodiments, include one or more persons and/or objects (e.g., live humans other than user 102 and/or other devices like a speaker which can output a voice command, etc.) in addition to the user 102. In such instances, it can be beneficial to determine the presence of the user 102 (e.g., the user 102 issuing the voice command 104).

For instance, determining the presence of the user 102 can include determining that the user 102 is a present live human proximate to the voice controlled device 108 prior to executing and/or processing a voice command 104. Determining the presence of the user 102 (e.g., to the voice controlled device 108) can prevent an unintended command from being performed and/or prevent a non-human voice command from resulting in a command being performed (e.g., a voice recording on a mobile cellular telephone, a voicemail machine, a recorder, etc.)

For instance, determining the presence of the user 102 to the voice controlled device 108 can include processing data from one or more sensors. A sensor, as used herein, can include a component internal to the voice controlled device 108 and/or an external device in the environment 100. That is, some embodiments, a sensor can be a component of an external device in the environment 100. Example sensors can include picture cameras, video cameras, snap sensors, binary sensors, proximity sensors, electric field sensors, temperature sensors, tomographic sensors, and/or radio frequency identification (RFID) sensors, among other sensors.

In some embodiments, the one or more sensors can take a measurement 110. The measurement 110 can include a presence measurement, for example. A presence measurement, as used herein, can include a measurement that identifies a presence of a user 102 (e.g., identifies the user 102 is a live human). Example presence measurements can include motion measurements, temperature measurements, distance measurements, proximity measurements, tomographic measurements, photographic and/or video measurements, and/or RFID measurements, among other measurements. In some instances, determining the presence of the user 102 to the voice controlled device 108 can include comparing the measurement 110 to a database (e.g., as further discussed herein).

As discussed herein, a signal 106 associated with the voice command 104 may be recognized (e.g., as illustrated by 106) by the speech recognition engine in the voice controlled device 108 and be converted into the device specific command. The voice controlled device 108 can process the voice command 104 with the speech recognition engine. One or more sensors (e.g., sensor associated with the voice controlled device 108) can take a measurement 110 to determine a presence of the user 102 to the voice controlled device 108. Upon verification that the user 102 is present to the voice controlled device 108, the device specific command can be executed by the voice controlled device 108, for example.

In various embodiments, the environment can include a number of sensors. For instance, determining a presence of the user 102 using a number of sensors can include preforming multi-modality user authentication. For instance, determining the presence of the user 102 can include processing data from a number of sensors, including the sensor, and determining the presence by fusing (e.g., combining) the processed data from the number of sensors.

A modality, as used herein, can include a particular way for information to be presented and/or communicated by a human (e.g., user 102). A multi-modality user authentication can include multiple modalities of information communicated by the user 102. For instance, the multiple modalities can be captured by the number of sensors. Examples modalities that can be captured can include voice (e.g., from the voice command 104), image (e.g., facial recognition techniques), proximity, and/or temperature, among other modalities, that can be used to determine the user 102 is a human and/or to identify the user 102.

The number of sensors can be used in combination to determine a presence of the user 102. Using the number sensors in combination can, for instance, allow for lower quality sensors (e.g., inexpensive sensors) to be used. The low quality sensors may each have outputs that are noisy (e.g., low quality) that are fused together to obtain an intended confidence (e.g., a particular threshold for accuracy). That is, inexpensive sensors can be used in combination to obtain a particular confidence.

For example, a first sensor can include a proximity sensor. The proximity sensor can identify that an object is proximate to the voice controlled device. The identification, on its own, may not include a determination that the object is a human (e.g., only identifies an object). A second sensor can include a temperature sensor. The temperature sensor can identify a change in temperature in the environment 100. Using the combined measurements from the proximity sensor and the temperature sensor, a determination can be made that the user 102 is present (e.g., is a live human).

Cost considerations of the voice controlled device 108 and/or environment 100 can be a limitation on the accuracy of the controlled device 108 and/or environment 100, and/or vice versa. For instance, with an increase in the amount of sensors used, accuracy can increase. However, with the increase in the amount of sensors, cost of the voice controlled device 108 and/or environment 100 can also increase.

In accordance with some embodiments, a video sensor may be used in combination with one or more other sensor types. The video sensor, in combination with one or more other sensor types, can be collocated with the voice command device 108. For instance, the video sensor may capture a set of video frames. The set of video frames can be processed to determine a presence of a user 102. In some instances, the video frames can be processed to determine a presence of a human face when a voice command 104 is received. This can help to determine that a human present to the voice controlled device 108 (e.g., the user 102 is facing the voice controlled device 108 and/or an associated system and present in the field of view of the video sensor).

A video sensor can assist in resolving a scenario where a human (e.g., user 102) is in presence of the voice controlled device 108, but is not addressing the voice controlled device 108 (e.g., user 102 is facing away from the voice controlled device 108, so a face is not detected and/or not present in the video sensor field of view). For example, the video sensor can be used to determine whether a user is addressing the voice controlled device 108.

A video sensor can be used to determine if the user is addressing the voice controlled device 108 by estimating a direction that the user 102 (e.g., a human) is looking at, for instance This can be achieved, for instance, by using video analysis of reflections of one or more eye pupils of the user 102. For example, an assisted light source emitter (e.g., near infrared (NIR) light source), which is fully eye safe, can be collocated with the video sensor and can emit NIR radiation which can be reflected back the user 102 eye pupils.

In some embodiments, the voice controlled device 108 can include and/or be in communication with a database. The voice controlled device 108 can compare the measurement 110 to the database to verify the user 102 is present to the voice controlled device 108 and/or to authorize the user 102. That is, some embodiments can include verifying whether a user 102 is an authorized user whose command can be processed by the voice controlled device 108 in addition to determining the user 102 presence (e.g., as discussed further herein). Further, if a video sensor is used, a face detection method can be used in addition to VID for verifying the authorization of the user 102 using the database (e.g., can compare the measurement 110 to authorization credentials from the database).

Figure 2:
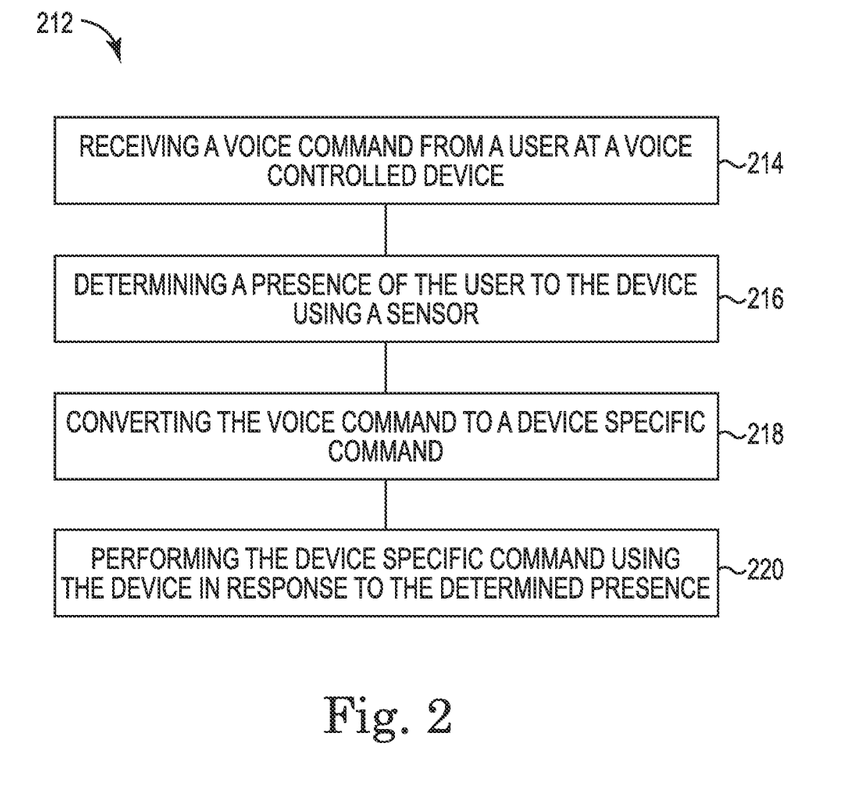
FIG. 2 illustrates an example of a method for user authentication of a voice controlled device according to one or more embodiments of the present disclosure.

FIG. 2 illustrates an example of a method 212 for user authentication of a voice controlled device according to one or more embodiments of the present disclosure.

At block 214, the method 212 can include receiving a voice command from a user at a voice controlled device. The voice controlled device can be located in an environment. The environment can be a work environment and/or home environment, in an example.

At block 216, the method 212 can include determining a presence of the user to the device using a sensor. In various embodiments, the sensor can include one or more sensors (e.g., as discussed further herein). The sensor can be an integrated component of the voice controlled device and/or can be a separate device (e.g., an external device) associated with the environment and in communication with the voice controlled device. Determining the presence can, for instance, include taking a measurement using the sensor. The measurement can include a presence measurement, for example. For instance, a presence measurement can include a human present measurement (e.g., a measurement to identify the presence of a human proximate to the device).

The method 212 can include, at block 218, converting the voice command to a device specific commend. For instance, converting can include processing the voice command using a speech recognition engine. For example, converting the voice command to a device specific command can include converting the voice command to text using a speech recognition module and/or engine and converting the text to a device specific command.

At block 220, the method 212 can include performing the device specific command using the device in response to the determined presence. That is, the voice command can be turned into a device specific command, which can instruct the voice controlled device to perform a function, only if the presence of the user (e.g. the presence of a human) is confirmed at block 216.

In some instances, identifying a user is present can include identifying the user is within a threshold presence to the device based on the determined presence. A threshold presence, as used herein, can include a threshold proximity value (e.g., a distance) and/or identifying the user is facing the voice controlled device (e.g., a discussed further herein). As an example, in response to determining the presence of the user and/or determining the user is within the threshold proximity (e.g., distance) value, the device specific command can be performed.

In accordance with one or more embodiments of the present disclosure, the method 212 can include verifying an authorization of the user using one or more sensors. Authorizing a user, as used herein, can include determining that the user is authorized to issue a particular command and/or access a particular resource (e.g., a voice controlled device). The sensor used to verify the authorization can include the same and/or different sensor that is used to measure a presence of the user to the voice controlled device. Verifying the authorization of the user can, for example, include comparing a measurement (e.g., an authorization measurement) from the sensor to a database and/or identifying the user issuing the voice command using face recognition technology.

User authorization can be dependent on the scenario of use and/or particular voice command. For example, a command to turn a security system on and/or off may use user authorization. A command to turn on and/or off a bedroom light may not use user authorization. Both examples may determine a presence of the user to prevent an unintentional and/or non-human command from being performed.

FIG. 3 illustrates an example environment 322 for user authentication of a voice controlled device 308 according one or more embodiments of the present disclosure. The environment 322 illustrated in FIG. 3 can include the environment 100 illustrated in FIG. 1, in various embodiments.

As illustrated in the embodiment of FIG. 3, the environment 322 can include a system comprising a voice controlled device 308 and/or one or more sensors 324-1, 324-2 . . . 324-N. The sensors 324-1 . . . 324-N can be internal and/or external to the voice controlled device 308. External sensors (e.g., as illustrated in FIG. 3) can be in communication with the voice controlled device 308. The communication, as used herein, can include a wired and/or wireless communication.

The voice controlled device 308, as illustrated in FIG. 3, can include the voice controlled device 108 illustrated in the embodiment of FIG. 1, in accordance with some embodiments of the disclosure. The voice controlled device 308, in various embodiments can include a microphone component to receive a signal 306 associated with a voice command 304 from one or more users (e.g., user 302) and a computing component. In some instances, the voice controlled device 308 can include a sensor component (e.g., one or more of the sensor components 324-1 . . . 324-N can be integrated components of the voice controlled device 308).

The computing component can be operable to determine a presence of the user 302 to the device 308 based on a presence measurement, determine a confidence measure for the voice command 304 based on the presence measurement, convert a received voice command 304 to text, convert the text to a device specific command, and perform the device specific command based on the determined presence and confidence measure. Determining a presence can include determining the user 302 is a human (e.g., and not a machine) using a presence measurement.

A confidence measure, as used here, can include metric value to recommend to perform an issued voice command 304. A confidence measure for a voice command 304 can be determined, for example, based on the presence measurement. For instance, a device specific command can be performed, in some instances, in response to the determined presence of the user 302 and/or the confidence measure of the voice command 304 being above, below, and/or within a threshold value.

In some instances, a threshold presence of the user 302 (e.g., as further discussed herein), can include the confidence measure, a sub-portion of the confidence measure, and/or can include a metric unrelated to the confidence measure (e.g., can be used to determine the presence of the user 302 and/or in addition to the determined presence).

In various embodiments, determining a presence of the user 302 and/or a confidence measure of the voice command 304 can include identifying that the user 302 is within a threshold proximity to the device 308. That is, in some instances, identifying the user 302 is within a threshold proximity can be used to determine that the voice command 304 has enough confidence to be accepted (e.g., that the user 102 is in good presence of the device). For instance, the voice controlled device 308 may perform the device specific command in response to identifying the user 302 is within the threshold proximity to the device 308. The device specific command can be denied (e.g., not performed) in response to identifying (e.g., calculating, estimating, etc.) the user 302 is not within the threshold proximity.

The environment 322 and/or the voice controlled device 308 can include one or more sensors 324-1, 324-2 . . . 324-N. The one or more sensors 324-1 . . . 324-N can communicate with the voice controlled device 308 and/or one or more connected devices 326-1, 326-2 . . . 326-P (as discussed further below). The communication can include a wireless and/or wired communication, for instance. That is, in some embodiments the one or more connected devices 326-1 . . . 326-P can include voice controlled devices that can be in communication with the one or more sensors 324-1 . . . 324-N. The sensors 324-1 . . . 324-N can communicate, to the one or more connected device 326-1 . . . 326-P, measurements taken and/or the connected devices 326-1 . . . 326-P can determine a presence of the user 302.

For example, the one or more sensors 324-1 . . . 324-N can take one or more measurements (e.g., measurement 310) associated with the user 302. The measurements (e.g., 310) can include presence measurements. A presence measurement can, for instance, be used to identify the presence of the user 302. The presence of the user 302 can be identified based on a motion measurement of a user 302 (e.g., using a binary sensor), a temperature change measured (e.g., using a temperature sensor), a distance (e.g., 310) of the user 302 (e.g., using a proximity sensors, electric field sensors, tomographic sensors, and/or RFID sensors), and/or video and/or photograph verification (e.g., using a video camera, camera, and/or snap sensor).

In some instances, the environment 322 and/or the voice controlled device 308 can include a number of sensor devices and/or components (e.g., sensors 324-1 . . . 324-N) to take a number of measurements. The plurality of measurements can include a plurality of presence measurements and/or authorization measurements. For instance, the one or more sensors 324-1 . . . 324-N can include a video camera (e.g., as illustrated by 324-1), a snap sensor, a binary sensor, a proximity sensor, an electric field sensor, a temperature sensor, a tomographic sensor, and/or an RFID sensor, among other sensors.

The choice of sensors to use can depend upon the particular use scenario. For instance, the sensors used in the environment 322 can depend on a level of security needs of the user 302 and/or the environment 322, and/or cost considerations. For instance, a high need for security may set a particular threshold for accuracy in determining a presence and/or user authentication of the environment 322 and may result in more expensive sensors than a low need for security.

A video camera (e.g., sensor 324-2) can be used to capture images. The resolution, cost, and/or size of the video camera (e.g. 324-2) can be varied depending on the particular embodiment. For instance, a video camera that is an integrated component of the voice controlled device 308 (e.g., not illustrated by FIG. 3) can have size and/or cost limitations due to the size of the voice controlled device 308 and/or price considerations of the voice controlled device 308. Using a video camera and/or other sensor (e.g., such as a snap sensor), the computing component of a voice controlled device 308 can, for example, determine a presence of a user 302 based on video verification measured by the video camera and/or other sensor. For instance, face recognition techniques can be used to determine a presence and/or authorization of a user 302 (e.g., as discussed further herein).

Different functions (e.g., algorithms) can be used based on a level of security concern of the voice controlled device 308, the environment 322 (e.g., other noise present, other users present, inside/outside, etc.), and/or what types of measurements or quality of images can be taken by the video camera (e.g., 324-2). For instance, the different functions can consider motion sensing and/or user silhouette identification to determine a presence of the user 302 to the voice controlled device 308. In various embodiments, a video camera (e.g., 324-2) can take an authorization measurement (e.g., as further discussed herein).

A snap sensor, as used herein, can include a low cost video sensor. A snap sensor can provide frame rate edge and/or contour images. The images can be analyzed to determine a presence of a user 302 in the field of view (e.g., to the voice controlled device 308).

A binary sensor can be used in a resource-constraint scenario (e.g., low cost). For instance, a binary sensory can include sensors such as break-beams, contact sensors, passive infrared and binary Doppler-shift sensors. Binary sensory can take motion measurements to determine a presence of a user 302 to the voice controlled device 308 (e.g., can detect motion). For instance, using a binary sensor, a computing component of a voice controlled device 308 can determine a presence of a user 302 based on a motion measurement of the binary sensor.

A proximity sensor can, for instance, include a sensor capable of detecting the presence of nearby objects without physical contact. For instance, a proximity sensor can emit an electromagnetic field and/or beam of electromagnetic radiation (e.g., infrared) and measure changes in the field and/or return signal. Example proximity sensors can include radio, Doppler-shift sensors, ultrasonic sensors, laser range finders, and/or photocells.

An electric field sensor can include a capacitor. For instance, an electric field sensor can detect a user 302 proximate to a voice controlled device 308 and measure the distance to the voice controlled device 308. The computing component of the voice controlled device 308 can, for instance, determine the presence of the user 302 based on a distance of the user 302 measured by the electric field sensor and/or other type of sensor (e.g., a proximity sensor).

A temperature sensor can include a sensor capable of measuring changes in temperature. For instance, using a temperature sensor, the computing component of the voice controlled device 308 can determine the presence of a user 302 by identifying a change in temperature in the environment 322 based on a temperature measurement taken by the temperature sensor.

A tomographic sensor can include a sensor that can take tomographic measurements around the periphery of the voice controlled device 308. For instance, the tomographic measurements can include measurements of the user 302 and can be used to determine the presence of the user 302 to the device. Example tomographic sensors can include radio frequency tomographic sensors, ultrasonic sensors, among other sensors.

An RFID sensor can include a sensor capable of detecting an RFID signal. For instance, the user 302 can be carrying an active and/or passive RFID emitting device and the RFID sensor can detect the presence of the device to determine a presence of the user 302 to the voice controlled device 308. RFID, in some embodiments, can be used to authorize the user 302 (e.g., as discussed further herein), by using token based authorization.

In accordance with embodiments of the present disclosure, the one or more sensors 324-1 . . . 324-N can be used to identify the user 302 is within a threshold presence for the voice command 304 to be accepted in addition to determining the presence of the user 302. In such an instance, the threshold presence can include a confidence measure and/or a sub-portion of a confidence measure. Identifying a threshold presence can include determining the user 302 is in within a threshold presence of the device 308. The determination can, for example, include determining the user 302 is within a threshold proximity (e.g., as discussed above) and/or that the user 302 is facing the voice controlled device 308 when speaking the voice command 304.

In various examples, a number of sensors can be used to determine the user 302 is within a threshold presence of the voice controlled device 308 based on face detection techniques in combination with eye detection. For instance, using an imager sensor (e.g., sensor 324-2) and face recognition/detection techniques, a determination can be made whether the user 302 is facing the voice controlled voice 308.

Face recognition/detection techniques are successful when the user 302 is in the field of view of the imager and may be useful with limited pose variation. In addition, a near IR sensor and/or imager can capture reflection of the illumination of the user's 302 eyes to determine if the user is looking at the voice controlled device 308. The near IR sensor and/or imager can include an imager sensor, for instance. Near IR illumination is reflected by the eye pupil of a person and can be used to determine where the person is looking to improve the interface, provide visual feedback at a location the person is looking at, improve GUI to minimize large variations in eye movement, among other uses.

As an example in accordance with one or more embodiments of the present disclosure, assume the voice controlled device 308 is a thermostat. An imager sensor (e.g., sensor 324-2) can be placed in proximity of the user interface of the thermostat (e.g., 308). For instance, a user interface can include a liquid-crystal display (LCD) screen. The imager sensor can be used to determine if the user 302 is facing the thermostat (e.g., 308) by using a combination of face recognition/detection and near IR illumination techniques. In such an example, the imager sensor (e.g., 324-2) can include a component of the voice controlled device 308 (e.g., an integrated component).

Alternatively and/or in addition, determining a threshold presence of the user 302 can include performing microphone based proximity analysis. Microphone based proximity analysis can, for instance, include using triangulation techniques on multiple signal strength measurements capture by a number of sensors to determine a threshold presence of the user 302. For instance, the number of sensors can include multiple microphones. When a user 302 speaks the voice command 304, the multiple microphones can be used to determine if the user a distance of the user and/or if the user is facing the voice controlled device 308 (e.g., to determine if the user is addressing the device).

The multiple microphones can each measure a signal strength of the voice command 304, and the multiple measured signal strengths (e.g., along with information regarding the placement of the multiple microphones) can be used to determine if the user 302 is facing the voice controlled device 308. The signal strength of the voice command 302 from the multiple microphones can be analyzed to determine the user 302 is within a threshold distance from the voice controlled device 308 and/or an angle of the user 302 (e.g., where the user 302 is looking) when issuing the voice command 304. For instance, using triangulation techniques, the multiple measured signal strengths can be used to determine the angle of the user 302 (e.g., where the user 302 is looking).

In some embodiments of the present disclosure, the one or more sensors 324-1 . . . 324-N can take authorization measurements. Authorization measurements can include measurements used to verify an authorization of the user 302. That is, an authorization measurement can be used to determine if a user 302 is authorized to issue the voice command 304. An authorization measurement can include the presence measurement and/or can include a separate measurement, for example. For instance, a sensor (e.g., sensor 324-2) can take an image of the user 302 issuing the voice command 304. The image from the sensor (e.g., 324-2) can be compared to a database to verify authorization of the user 302. In some instances, the verification can be based on face recognition technology (e.g., compare the image to a stored image to verify authorization). Further, the verification can be based on VID technology (e.g., compare the voice command to a stored voice command to verify authorization) and/or other biometric comparisons.

The determination of a presence, an authorization, and/or identification that the user 302 is within a threshold presence to the voice controlled device 308 can include processing data from the one or more sensors 324-1 . . . 324-N using an embedded processor on the voice controlled device 308 and/or the embedded processor communicating the data from the one or more sensors 324-1 . . . 324-N to an external server. The external server, as used herein, can be local to the environment 322 and/or external to the environment (e.g., on a cloud system), for example. The external server can process the data and communicate a determination back to the voice controlled device 308. Processing the data using an external server can, for instance, lower the cost of the voice controlled device 308 by reducing computing capabilities needed.

As illustrated in the embodiments of FIG. 3, the environment 322 can include one or more connected device 326-1, 326-2 . . . 326-P. The connected devices 326-1 . . . 326-P can include external devices (e.g., external to the voice controlled device 308). The connected devices 326-1 . . . 326-P can, in some instances, include voice controlled devices. In such an instance, the voice controlled device 308 can include a centralized and/or main voice controlled device in the environment 322. The connected devices 326-1 . . . 326-P can be connected (e.g., wirelessly) to the voice controlled device 308 such that the voice controlled device 308 can communicate with the connected devices 326-1 . . . 326-P.

For instance, the voice controlled device 308 can communicate the determined presence and/or authorization of the user 302 to the one or more connected devices 326-1 . . . 326-P. In such an instance, the one or more connected devices 326-1 . . . 326-P can be voice controlled but may not have computing capabilities, integrated sensor components, and/or may be unable to communicate with sensor devices (e.g., 324-1 . . . 324-N) in the environment 322 to determine a presence and/or authorization of the user 302. By allowing the voice controlled device 308 to communicate the presence and/or authorization of the user 302, the connected devices 326-1 . . . 326-P can be voice controlled with better user experience and security at a lower cost as compared to devices that do not determine a presence of the user 302 and/or that determine a presence of the user 302 individually.

Alternatively and/or in addition, the voice controlled device 308 and the one or more connected devices 326-1 . . . 326-P can be used to perform a multi-layered authentication. A multi-layered authentication can include authenticating a user 302 in an environment 322 using multiple devices (e.g., voice controlled device 308 and connected devices 326-1 . . . 326-P) and/or one or more rules. The multiple devices can in communication and/or can use the communication to comply with the one or more rules.

A rule, as used herein, can include computer-executable instructions and/or logic with one or more actions to perform in response to returning true or false. A rule can have a conventional two-part form: an if-part defining a condition and a then-part defining a conclusion or action that is asserted if the condition is satisfied. In such instances, the one or more connected devices 326-1 . . . 326-P can have the ability to authenticate a user 302 (e.g., determine a presence) individually (e.g., without the use of the voice controlled device 308).

For example, the multi-layered authentication can include the voice controlled device 308 authenticating the presence of the user 302 and communicating the presence to the one or more connected devices 326-1 . . . 326-P. The connected devices 326-1 . . . 326-P can use the communicated presence to authenticate the user 302 based on one or more rules. For instance, the one or more rules can include a threshold period of time (e.g., use the previously determine presence to authenticate the user within a threshold time). A threshold period of time can include a predetermined amount of time (e.g., thirty seconds, five minutes, thirty minutes, etc.). Within the threshold period of time, the authentication determined from another device can be reused. If the threshold period of time has elapsed, the connected devices 326-1 . . . 326-P may re-authenticate the user 302. This can assist in increasing system performance and reducing the number of user authentication instances.

As an example, assume the voice controlled device 308 includes a camera based security system (e.g., a security system with a camera sensor). The camera based security system (e.g., 308) can authenticate the user 302 at an entry door using one or more sensors (e.g., 324-1 . . . 324-N). Assume a connected device (e.g., connected device 326-1) include a voice controlled thermostat. The camera based security system (e.g., 308) can communicate the determined presence of the user 302 to the voice controlled thermostat (e.g., 326-1). If the user 302 issues a voice command to the voice controlled thermostat (e.g., 326-1) within a threshold period of time (e.g., a predetermined amount of time) from the determined presence (e.g., by the camera based security system), the voice controlled thermostat (e.g., 326-1) can use the communicated determined presence to authenticate the user (e.g., determine the user 302 is a live human), irrespective of whom the user 302 is (e.g., no need for ensuring that the voice command is used by a human as the presence of the human has been determined at the door within the threshold period of time).

As another example, a determined presence of a different user (e.g., a user that is different than the user 302) can be received at the voice controlled device 308 from a connected device (e.g., a different voice controlled device, such as connected device 326-1). The voice controlled device 308 can instruct a different connected device (e.g., connected device 326-2) to use the communicated determined presence to authenticate the different user within a threshold period of time. The different user, in various embodiments, can include the user 302 and/or a different user than the user 302.

In various embodiments of the present disclosure, the voice controlled device 308 can communicate the device specific command to a connected device (e.g., 326-1 . . . 326-P) and the connected device can perform the device specific demand. In such an instance, the voice controlled device 308 can include a centralized device in the environment 322 with one or more sensors 324-1 . . . 324-N (e.g., sensors integrated in the voice controlled device 308 and/or in communication with the voice controlled device 308). The voice controlled device 308 can communicate commands from the user 302 to one or more connected devices 326-1 . . . 326-P in the environment 322, wherein the voice controlled device 308 processes (e.g., decipher and translates) the voice command to a device specific command. This can reduce computing capabilities used by the one or more connected devices 326-1 . . . 326-P while allowing the connected devices 326-1 . . . 326-P to be voice controlled.

As an example, the user 302 can give a voice command 304 intending to pre-heat the oven (e.g., connected device 326-2). The user 302 can speak the voice command 304 to the voice controlled device 308. The voice controlled device 308 can convert the voice command 304 to a device specific command, determine a presence of the user 302 to the voice controlled device 308, determine a confidence measure of the voice command 304 based on the presence measurement, and communicate the determined presence and/or the converted device specific command to the oven (e.g., 326-2) based on the determined presence and confidence measure (e.g., being within and/or outside a threshold). The oven (e.g., 326-2) can execute to the device specific command (e.g., can turn the oven on to a specified degree).

Figure 4:
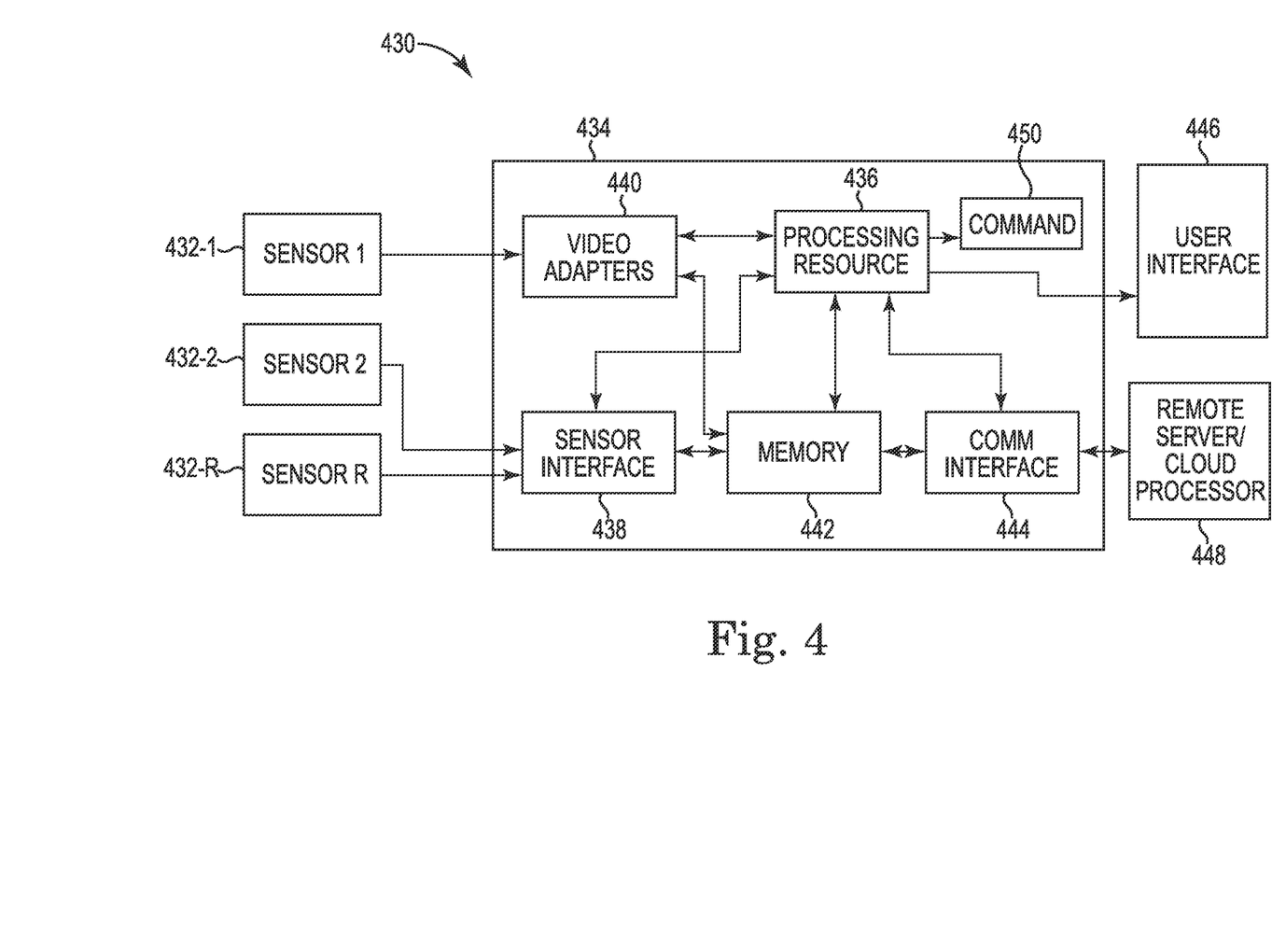
FIG. 4 illustrates a block diagram of an example system in accordance with one or more embodiments of the present disclosure.

FIG. 4 illustrates a block diagram of an example system 430 in accordance with one or more embodiments of the present disclosure. As shown in the embodiment of FIG. 4, the system 430 includes hardware components (e.g., unit 434) that can be utilized to implement various embodiments, including the embodiments described in FIGS. 1-3. The unit 434, in accordance with some embodiments, can include a voice controlled device. The unit 434 can be implemented inside the frame containing the sensors 432-1, 432-2 . . . 432-R and user interface unit 446 and/or the sensors 432-1 . . . 432-R can be separated devices. The unit 434 can include a processing resource 436 which communicates with the sensors and/or one or more connected devices either by wired or wireless communication. Unit 434 can also be a remote processing unit which communicates with other components through a communication (comm) interface 444.

The processing resource 436 can perform sensor messages (e.g., video, image, and/or other messages containing measurements from the sensors) processing on inputs from the one or more sensors 432-1 . . . 432-R. The processing resource 436 may include a system controller including a digital signal processor (DSP), field-programming fate array (FPGA), and/or a microcontroller, among other type of hardware capable of executing a set of instructions and a computing coprocessor which may be based on advanced risc machines (ARM) or graphics processing unit (GPU) based architecture. A computing coprocessor can have the capability to handle parallel sensor message processing on large arrays of data from multiple sensors (e.g., sensor 1 432-1, sensor 2 432-2 . . . sensor R 432-R)

As shown in FIG. 4, one or more sensors 432-1, 432-2 . . . 432-R can provide input sensor messages. The sensors 432-1 . . . 432-R, which may differ in both the intrinsic and extrinsic parameters, are connected to a sensor interface 438 and/or video adapters 440. In some embodiments, sensor interface 438 has the capability to connect to sensors with multiple different configurations, results, and/or encode/decode standards. Along with the video adapters 440, the sensor interface 438 may utilize the processing capabilities of processing resource 436 or may have other dedicated processing units. Further, the processing resource 436, video adapters 440, and sensors 432-1 . . . 432-R may have access to a memory resource 442, which serves as tempering bugger for processing or storing sensor messages and/or determined authorizations and/or authentications of a user.

Although the present embodiment illustrated in FIG. 4, illustrates video adapters 440 with input from a sensor (e.g., sensor 1 432-1), embodiments in accordance with the present disclosure are not so limited. Video adapters 440 can be used when one or sensors (e.g., sensor 432-1) of the system 430 include a video sensor (e.g., a video device and/or camera). In such an instance, video adapter 440 can be a portion of the system 430. In various embodiments, a video sensor may not be used. In such embodiments, the system 430 may not include video adapters 440 and the output of the one or more sensors (e.g., sensor 432-1 . . . 432-R) can be input to a sensor interface 438.

The user interface unit 446 can provide visual and/or audio feedback to a user. For instance, the visual and/or audio feedback can include the success and/or failure of command processing (e.g., command 450 output from the processing resource 436). The user interface unit 446 can also provide information derived from the sensors 432-1 . . . 432-R regarding the command confidence (e.g., confidence measure of the voice command) which can be used to determine the success and/or failure of a command 450.

The memory resource 442 can include computer-readable medium (CRM) in communication with the processing resource 436. For instance, the CRM can include a tangible non-transitory CRM storing a set of computer-readable instructions (CRI) executable by the processing resource 436, as described herein. The CRI can also be stored in remote memory managed by a server (e.g., a remote server and/or cloud processor 448) and represent an installation package that can be downloaded, installed, and executed. The unit 434 can include the memory resource 442, and the processing resource 436 can be coupled to the memory resource 442.

Embodiments of the system 430 can include a communication interface 444, which has the ability to use different wireless standards like 802.11a/b/g/n, Bluetooth, Wimax, and/or NFC, among other standards from communicating to a remote server (e.g., remote computing/storage device) or cloud processor 448 for offloading computation processing from the processing resource 436.

The processing resource 436 can execute CRI that can be stored on an internal or external non-transitory CRM. The processing resource 436 can execute CRI to perform various functions. For example, the processing resource 436 can execute CRI to determine a presence of a user to a voice controlled device. A non-transitory CRM, as used herein, can include volatile and/or non-volatile memory. Volatile memory can include memory that depends upon power to store information, such as various types of dynamic random access memory (DRAM), among others. Non-volatile memory can include memory that does not depend upon power to store information.

The CRM can be in communication with the processing resource 436 via a communication path. The communication path can be local or remote to a machine (e.g., a computer) associated with the processing resource 436. Examples of a local communication path can include an electronic bus internal to a machine (e.g., a computer) where the CRM is one of volatile, non-volatile, fixed, and/or removable storage medium in communication with the processing resource 436 via the electronic bus.

The communication path can be such that the CRM is remote from the processing resource (e.g., 436) such as in a network relationship between the CRM and the processing resource (e.g., 436). That is, the communication path can be a network relationship. Examples of such a network relationship can include a local area network (LAN), wide area network (WAN), personal area network (PAN), and the Internet, among others. In such examples, the CRM can be associated with a first computing device (e.g., remote server/cloud processor 448) and the processing resource 436 can be associated with a second computing device (e.g., a Java® server, the voice controlled device, the unit 434, etc.). For example, a processing resource 436 can be in communication with a CRM, wherein the CRM includes a set of instructions and wherein the processing resource 436 is designed to carry out the set of instructions to determine a presence of a user to a voice controlled device.

The processing resource 436 coupled to the memory resource 442 can determine a presence of the user to a voice controlled device using a presence measurement. In some embodiments, the processing resource 436 coupled to the memory resource 442 can identify that the user is within a threshold presence (e.g., within a threshold proximity and/or facing the device) to the device based on the determined presence. For instance, identifying the user is within a threshold presence based on the determined presence can include using the presence measurement.

The processing resource 436 coupled to the memory resource 442 can determine a confidence measure for the voice command based on the presence measurement. Based on the confidence measure, the command 450 can be output and/or performed, for instance. In various embodiments, the identification that the user is within the threshold presence can include the confidence measure and/or a sub-portion of the confidence measure. Alternatively and/or in addition, the threshold presence can include a separate metric than the confidence measure.

The processing resource 436 coupled to the memory resource 442 can process a received voice command. Processing a received voice command can include converting the received voice command to text and converting the text to a device specific command 450, for example.

The processing resource 436 coupled to the memory resource 442 can perform the device specific command 450 in response to identifying the user is within the threshold presence to the voice controlled device and based on the determined confidence measure. For example, the device specific command 450 can be performed in response to the user being within the threshold presence and the determined confidence measure being outside and/or within a threshold value.

Performing the device specific command 450, in some instances, can include performing a subset of the device specific command 450. For example, the device specific command 450 can include a command to send a remaining portion of the device specific command 450 to a connected device (e.g., as discussed herein).

The processing resource 436 coupled to the memory resource 442 can communicate the determined presence of the user to a connected device. The connected device, in some instances, can include a plurality of wirelessly connected devices.

In some embodiments, the processing resource 436 coupled to the memory resource 442 can communicate the device specific command 450 and/or a portion of the device specific command 450 to the connected device. For instance, the voice controlled device can communicate (e.g., wirelessly and/or wired) with the connected device and the connected device can be operable to perform the device specific command 450 and/or portion of the device specific command 450.

As used herein, "logic" is an alternative or additional processing resource to execute the actions and/or functions, etc., described herein, which includes hardware (e.g., various forms of transistor logic, application specific integrated circuits (ASICs), etc.), as opposed to computer executable instructions (e.g., software, firmware, etc.) stored in memory and executable by a processor.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A method for user authentication of a voice controlled device, the method comprising:
   receiving a voice command from a user at the voice controlled device;
   determining a presence of the user to the voice controlled device using a sensor, wherein the presence of the user is within a threshold presence in proximity to the voice controlled device;
   determining a confidence measure based on the determined threshold presence, wherein the confidence measure indicates the user's intention to address the voice controlled device;
   converting the voice command to a device specific command when the presence of the user is within the threshold presence;
   performing the device specific command using the device in response to the determined threshold presence and confidence measure; and
   denying the device specific command in response to identifying that the user is not within the threshold presence based on the determined confidence measure.

2. The method of claim 1, wherein determining the presence of the user includes performing multi-modality user authentication.

3. The method of claim 1, wherein determining the presence of the user includes performing microphone based proximity analysis.

4. The method of claim 1, wherein determining the presence of the user includes:
processing data from a number of sensors, including the sensor; and
determining the presence of the user by fusing the processed data from the number of sensors.

5. The method of claim 1, including determining to perform the device specific command including determining the presence of the user using facial recognition techniques.

6. The method of claim 1, wherein determining the user is within the threshold presence includes:
analyzing a signal strength of the voice command from a number of sensors to determine the user is within a threshold distance from the voice control device and an angle of the user when issuing the voice command.

7. The method of claim 6, including verifying an authorization of the user using the sensor, wherein verifying the authorization of the user includes comparing a measurement from the sensor to a database.

8. The method of claim 1, wherein determining the presence of the user to the voice controlled device includes:
determining the presence of the user using a number of sensors, wherein the number of sensors includes the sensor and wherein each of the number of sensors include a component of an external device in an environment; and
communicating the determined presence of the user to a connected device in the environment.

9. A voice controlled device, comprising:
a microphone component to receive a voice command from a user;
a sensor component to take a presence measurement associated with the user; and
a computing component operable to:
determine a presence of the user to the voice controlled device based on the presence measurement;
determine a confidence measure for the voice command based on the presence measurement, wherein the confidence measure is based on a threshold presence of the user in proximity to the voice controlled device, and wherein the confidence measure indicates the user's intention to address the voice controlled device;
convert the received voice command to text when the confidence measure is within the threshold presence;
convert the text to a device specific command;
perform the device specific command based on the determined presence and confidence measure; and
deny the device specific command in response to identifying that the user is not within the threshold presence based on the determined confidence measure.

10. The device of claim 9, wherein the computing component operable to determine the presence is operable to determine the presence of the user based on at least one of a motion measurement of the sensor, a temperature change measured by the sensor, a distance of the user measured by the sensor, and video verification measured by the sensor.

11. The device of claim 9, where the computing component operable to determine the confidence measure is operable to determine the confidence measure based on a sensor fusion associated with an intended confidence.

12. The device of claim 9, wherein the computing component is operable to determine that the user is addressing the voice controlled device in addition to the determined presence of the user.

13. The device of claim 9, wherein the computing component is operable to determine the user is within a threshold proximity to the voice controlled device to determine the presence of the user to the voice controlled device.

14. The device of claim 9, wherein the computing component is operable to perform a multi-layered authentication including communicating the determined presence to a connected device.

15. A system for user authentication of a voice controlled device, comprising:
a sensor device to take a presence measurement associated with a user; and
a voice controlled device, including:
a microphone component to receive a voice command from a user; and
a computing component operable to:
determine a presence of the user to the voice controlled device using the presence measurement;
identify the user is within a threshold presence to the device based on the determined presence;
determine a confidence measure for the voice command based on the presence measurement, wherein the confidence measure indicates the user's intention to address the voice controlled device;
convert the received voice command to text;
convert the text to a device specific command;
perform the device specific command in response to identifying the user is within the threshold presence to the voice controlled device and based on the determined confidence measure;
communicate the determined presence of the user to a connected device; and
deny the device specific command in response to identifying that the user is not within the threshold presence based on the determined confidence measure.

16. The system of claim 15, wherein the computing component is operable to authorize the user using an authorization measurement from the sensor device.

17. The system of claim 15, wherein the computing component is further operable to:
receive a determined presence of a different user from the connected device; and
instruct a different connected device to use the communicated determined presence to authenticate the different user within a threshold period of time.

18. The system of claim 15, wherein the computing component is operable to communicate the device specific command to the connected device and the connected device is operable to perform the device specific command.

19. The system of claim 15, wherein the sensor device includes a plurality of sensor devices in an environment to take a plurality of presence measurements.

* * * * *